Sept. 7, 1926.
F. E. BEST
LOCK
Filed June 16, 1924
1,599,314
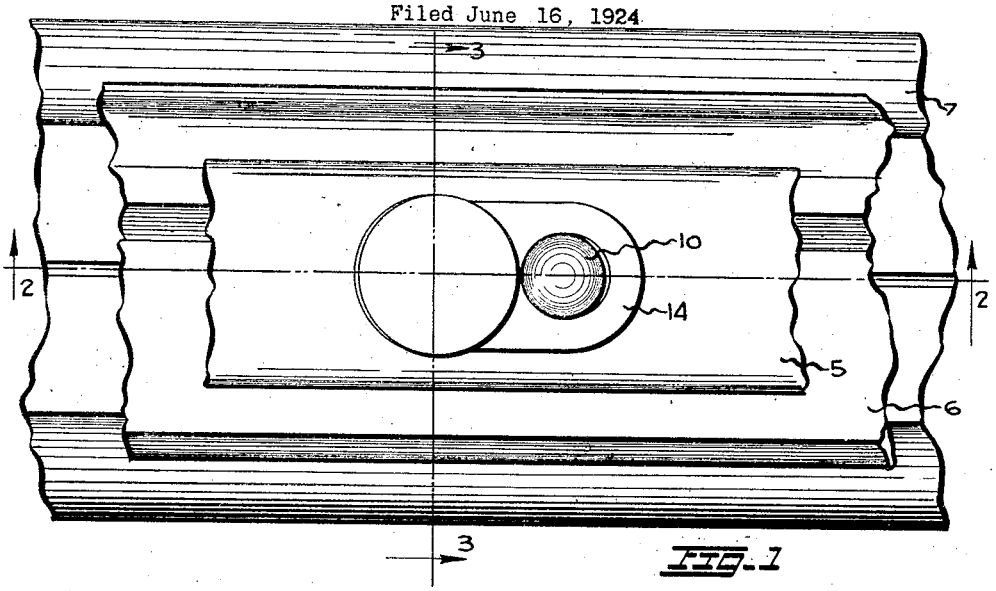
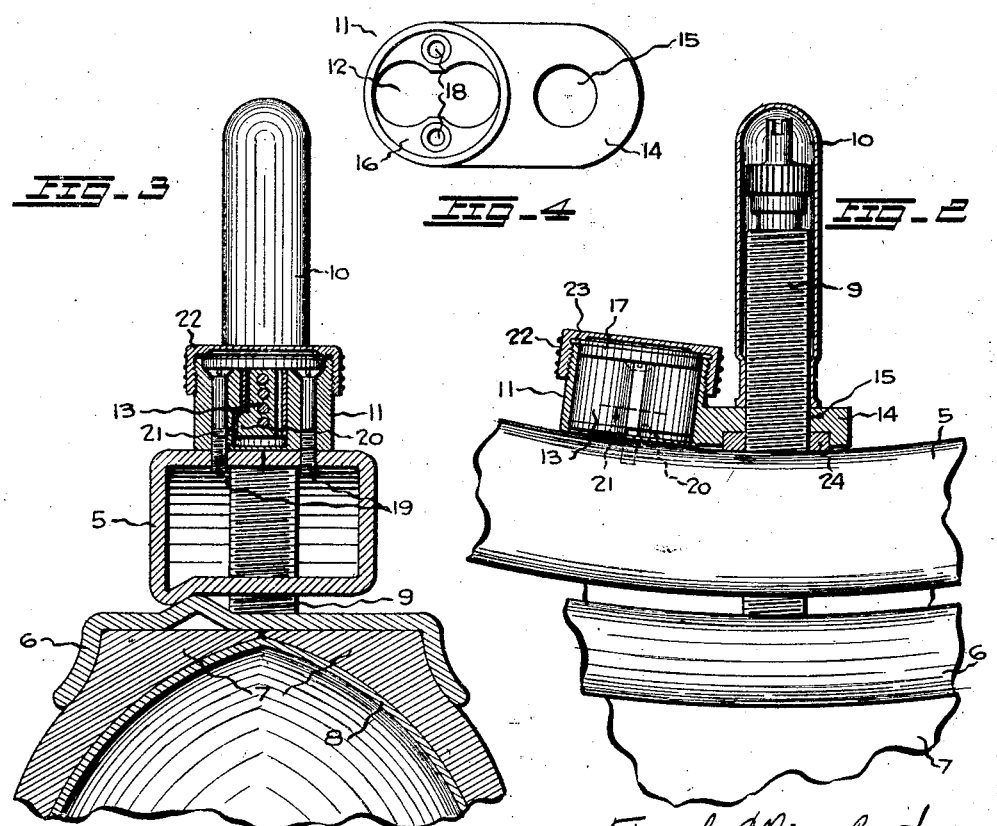
Frank Ellison Best
INVENTOR Patented Sept. 7, 1926.

1,599,314

UNITED STATES PATENT OFFICE.

FRANK ELLISON BEST, OF SEATTLE, WASHINGTON, ASSIGNOR TO FRANK E. BEST, INC., OF SEATTLE, WASHINGTON, A CORPORATION OF WASHINGTON.

LOCK.

Application filed June 16, 1924. Serial No. 720,371.

My invention relates to improvements in locks for pneumatic tire valves and the object of my improvement is to provide a simple and efficient lock that is absolutely moisture proof and that may be used for locking a tire valve to a rim to thereby make it difficult for unauthorized persons to remove a tire from a rim.

Further and more specific objects are to provide a lock of this nature embodying a lock housing that is arranged to screw onto a tire valve and to be secured to a rim by means that is accessible and can be released only when a lock core which is removable by the use of a key is withdrawn from said housing.

Other and more specific objects will be apparent from the following description taken in connection with the accompanying drawings.

In the drawings Figure 1 is a plan view looking down onto a lock constructed in accordance with my invention as the same may appear when installed on a valve, a fragment only of the wheel rim with which the valve is connected being shown.

Fig. 2 is a sectional view on broken line 2—2 of Fig. 1, parts being shown in elevation.

Fig. 3 is a sectional view on broken line 3—3 of Fig. 1 showing parts in elevation.

Fig. 4 is a detached plan view of the lock housing with the lock core removed.

Like reference numerals designate like parts throughout the several views.

In the drawings I have shown a fragment of a wheel felloe 5 having the usual rim 6 thereon for the reception of a tire 7 and tube 8 to which is connected an air valve stem 9 that extends through the felloe 5 and is provided with a valve cap or housing 10.

The lock embodies a lock housing 11 having a receptacle 12 of figure 8 cross sectional shape for the reception of a lock core 13 that may be removably locked within the housing by key operated means. The housing is provided on one side with an outwardly protruding lug 14 having a threaded perforation 15 that is adapted to screw over the externally threaded valve stem 9.

The lock housing 11 is preferably counterbored, as at 16, at the upper end, for the reception of a face plate 17 on the lock core 13 and, is provided at the location of the indentations at the sides of the figure 8-shaped core receiving recess 12 with perforations 18 through which screws 19 may be inserted and screwed into the felloe of the wheel, the upper ends of the perforations 18 being suitably countersunk for the reception of the heads of screws 19. If a wooden felloe is used, then wood screws will be used. The bottom of housing 11 is integral to exclude moisture.

The lock core 13 is provided with a key operated gate 20 arranged to interlock with a shoulder 21 in the lock housing, and the face plate 17 on the lock core is adapted to cover the heads of the screws 19 and prevent access to said screws except when the lock core is removed.

The outer end of the lock housing is externally threaded for the reception of a screw cap 22 that has a packing washer 23 on the inside thereof and that forms a moisture proof closure and seal for said lock housing.

The heads of the screws 19 are made to seat accurately and tightly in the countersunk portions of the screw holes 18, or, if desired packing may be used around the heads of said screws to preclude any possibility of moisture entering the lock housing through the screw holes.

A washer 24 of packing or cushioning material is interposed between the felloe 5 and the bottom side of the lug 14 that screws over the valve stem 9.

An important feature of this invention resides in the provision of a removable lock core that is disposed within an absolutely moisture proof housing, the moisture proof feature being important in a tire valve lock which is often immersed in mud and water and also being capable of embodiment in many other locks that are subjected to moisture when in use.

In applying this lock to a tire valve, the extension 14 is first screwed down over the valve stem 9 tightly onto the felloe 5 and the lock housing is brought to rest in such a position that the screw holes 18 therein register with corresponding holes in the felloe. The screws 19 are then inserted and rigidly secure the lock housing to the felloe 5. The core 13 is then inserted and locked within the housing 11 and the cap 22 is applied to the housing to form a moisture proof closure.

The lock may be removed by first removing the cap 22, then unlocking and removing the lock core 13, then removing the screws 19, and then unscrewing the extension 14 from the valve stem 9.

The locking of the valve stem 9 makes it impossible to remove this stem from the wheel and renders it extremely difficult for unauthorized persons to remove the tire 7 and tube 8 from the wheel without damaging the same.

Obviously this lock may be adapted for various uses other than the one disclosed and numerous changes in the form, construction and arrangement of the various parts of the same may be resorted to within the scope and spirit of the following claims.

I claim:

1. In a tire valve lock of the class described, the combination with a tire valve arranged to project through a tire supporting structure, of a locking member arranged to be secured to said tire valve, releasable means for securing said locking member to said tire supporting structure, and key operated lock means controlling access to said securing means.

2. The combination with a tire valve, of a lock core housing having means arranged to engage with and hold said tire valve, a lock core arranged to be removably locked within said lock core housing and means inaccessible when said lock core is within said housing for securing said housing to the felloe of a wheel.

3. A lock for a tire valve embodying a lock core housing, an extension on said housing having a threaded perforation arranged to screw over a tire valve, a lock core arranged to be removably locked in said housing and screw means accessible when said lock core is removed for securing said lock core housing to the felloe of a wheel.

4. A lock for a tire valve embodying a lock core housing, an extension on said lock core housing having a threaded perforation arranged to screw over a tire valve, a lock core arranged to be removably locked in said housing, means arranged to be inserted from within said housing and accessible when said lock core is removed for securing said housing to a wheel felloe and cap means forming a moisture proof closure for said housing.

FRANK ELLISON BEST.